INVENTOR
ROBERT R. ERNST

ATTORNEYS

A biological sterility indicator including a sealed semi-permeable envelope 10 being permeable to water and impermeable to bacteria in either liquids or gases, a selected quantity of suitable unincubated test organism 12, and growth media 18 and dye indicator 20, all preferably sealed within the envelope. The indicator is rendered suitable for testing multiple types of sterilizing media by utilizing multiple types of test organisms, each of which is sufficiently resistant to at least one of such sterilizing media thereby to yield an accurate test of all such sterilizing media.

United States Patent Office 3,846,242
Patented Nov. 5, 1974

3,846,242
BIOLOGICAL STERILITY INDICATOR AND
METHOD FOR USING SAME
Robert R. Ernst, Rochester, N.Y., assignor to Sybron Corporation, Rochester, N.Y.
Application July 14, 1967, Ser. No. 653,414, now Patent No. 3,585,112, which is a division of application Ser. No. 503,987, Oct. 23, 1965, now Patent No. 3,346,464, which in turn is a continuation-in-part of abandoned application Ser. No. 272,035, Apr. 10, 1963. Divided and this application Dec. 28, 1970, Ser. No. 101,760
The term of this patent subsequent to Oct. 10, 1984, has been disclaimed
Int. Cl. G01n 33/00
U.S. Cl. 195—103.5    12 Claims

ABSTRACT OF THE DISCLOSURE

A biological sterility indicator including a sealed semi-permeable envelope 10 being permeable to water and impermeable to bacteria in either liquids or gases, a selected quantity of suitable unincubated test organism 12, and growth media 18 and dye indicator 20, all preferably sealed within the envelope. The indicator is rendered suitable for testing multiple types of sterilizing media by utilizing multiple types of test organisms, each of which is sufficiently resistant to at least one of such sterilizing media thereby to yield an accurate test of all such sterilizing media.

---

This application is a divisional application of my co-pending application 653,414, filed July 14, 1967, now U.S. Pat. No. 3,585,112, which was a divisional application of my copending application 503,987, filed Oct. 23, 1965, and now U.S. Pat. No. 3,346,464, which was a continuation-in-part application of my prior copending application Ser. No. 272,035 filed Apr. 10, 1963, and now abandoned.

This invention relates to a biological sterility indicator and method for making and using same. In attempting to solve the problem of testing sterility, many inadequate solutions have come to the forefront. Sterility indicators can be basically classified as physical, chemical and biological. While all commercially available types of indicators are constantly being improved, the only acceptable and true indication of sterilization is the biological type. The biological indicator is usually designed to provide a safety factor for the sterilization process. A test organism is selected which is many times more resistant to the sterilization process employed than most organisms which would be present by natural contamination such as pathogens. Thus, by adjusting the contamination level of the test organism, a safety factor is provided which will assure sterility of the product to be sterilized if prescribed sterilization parameters are followed. To further guarantee sterility, indicators are placed in strategically difficult-to-sterilize locations within the selected sterilizer.

After exposure to the sterilization process, biological indicators in the past had to be aseptically transferred by trained personnel to aseptic testing areas, whereby under fastidious, aseptic techniques, the trained personnel subjected the microorganisms to suitable sterile growth media for a suitable incubation period at a proper temperature to determine the effective kill of the sterilization. Visual observation of any growth of the test organisms in the growth media causing turbidity has generally been the indication of lack of effective sterilization.

A chemical acid-base (pH or oxidation-reduction-potential (O-R) dye indicator has oftentimes been added to the growth media. A change in dye color or bleaching produced by chemical changes in the growth medium by the metabolizing test organisms provides a better and quicker visual check on unsterile results than mere turbidity.

Known biological sterility testing procedures require trained personnel for competent interpretation of the results and to determine whether or not any contamination may have been introduced in the transfer process.

Because of the difficulty involved in acquiring and training personnel skilled both in the mechanical and biological arts to check the effectiveness of sterilization procedures, manufacturers of sterilization equipment have attempted to produce sterilizers and related equipment which would require little or no professional skill by including sufficient safety devices in the sterilizers themselves to prevent mishaps which otherwise result in unsterile goods. Usually excessive sterilization periods are prescribed to insure complete sterilization.

Physical indicators have oftentimes been built into the sterilizers, such as thermometers, pressure gauges, and the like; however, such indicators do not indicate completely the physical parameters necessary to achieve sterilization. Superheat or radiant heat may provide a false indication of the proper conditions for steam sterilization with lag thermometers. Superheat and residual air would also provide a false indication on a pressure responsive gauge.

Commercial chemical indicators are chemicals which indicate sterility by color changes, or change from solid to liquid state; however, these also are subject to inaccuracies.

Only the living organism can sense the true relationships of physical chemical parameters necessary to affect sterilization. Neither the physical nor chemical indicators can indicate over the entire range of parameters interrelating time, temperature and concentrations of moisture, chemicals, or radiation dose. Therefore, it is recognized in the art of sterilizing that biological tests are the most accurate sterility tests.

Because of the recognized superiority of biological tests, manufacturers of sterility indicators have attempted to simplify the biological tests to eliminate the tedious aseptic transfer and treatment during the testing period subsequent to sterilization. As for example, one type of biological indicator for steam contains spores of a thermophilic bacterial species in a liquid culture medium within a sealed glass vial. This organism will not grow at ambient temperatures. Incubation of this vial at the proper temperature will initiate growth. With this test, no allowance is made for the quality of the steam used. A high degree of superheat or residual air might render the sterilization process ineffective; however, since this indicator is dependent only on time of exposure to an external heat source at a specific external temperature without regard to saturation of the steam, it is quite possible that a false indication may result. Also, this indicator would not be responsive to chemical sterilization. Although this type of indicator obviates aseptic techniques and media preparations, it is limited to penetrative heat or radiation and to thermophilic organisms.

Other biological indicators are commercially available, some of which comprise bacterial spores impregnated in filter or blotter paper strips. These require aseptic handling and transfer and the preparation and utilization of sterile growth media. The possibilities of contamination in transfer from one sterile environment to another is not avoided.

One commercial preparation incorporates spores and dried media with dye directly on blotter paper strips. It is necessary to provide sterile distilled water in sterile glass tubes to which the strips must be aseptically transferred. Another difficulty with this preparation is that it cannot be used for gaseous sterilization since microorganisms are sometimes encapsulated in crystal structures during the preparation of the indicators, thereby forming a protective barrier against the penetration of necessary moisture and/or gaseous killing agents.

Thus, prior to my invention, there is no satisfactory simple sterility indicator or method for making and using the same.

It is one object of my invention to provide a more satisfactory biological sterility indicator and method for making and using same.

It is a further object of my invention to provide a simplified biological sterility indicator and method for making and using same.

It is a further object of my invention to provide improved biological sterility indicator and method for making and using the same, being adapted for use with all of the common sterilizing media, i.e., steam, dry heat, radiation, ethylene oxide, propylene oxide, methyl bromide and other gaseous agents.

It is another significant object of my invention to provide an improved biological sterility indicator and method for making and using the same which does not require aseptic transfer or treatment following sterilization and during the testing period.

Other objects and advantages of this invention will be particularly set forth in the claims and will be apparent from the following description, when taken in connection with the accompanying drawings, in which:

Figure 1:
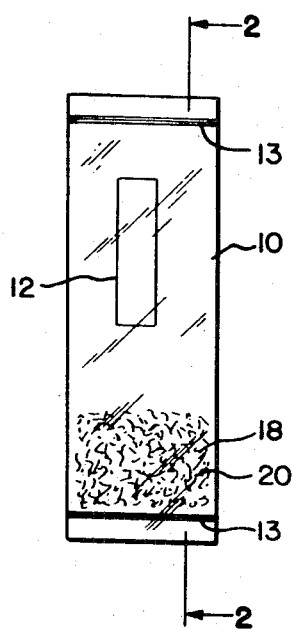
FIG. 1 is a planar view of one embodiment of my invention.

As viewed in FIG. 1, my invention is characterized by a sealed semi-permeable envelope, bag, or container 10 being constructed of a dialyzing film permeable to selected sterilizing media, permeable to water and impermeable to bacteria present in either liquids or gases and preferably of plastic composition, such as polyamide-6 sold under the trademark "Capran–77C" by Allied Chemical Company.

Within the semi-permeable envelope 10, is sealed a selected quantity of a suitable unincubated test organism and carrier 12, the test organisms 12 being selected because of its responsiveness to the selected sterilizing media. This semi-permeable envelope 10 might be formed for example, by heat-sealing folded plastic webbing or tubing to form an envelope. As used herein, the term "webbing" is broadly intended to mean a sheet or strip of film, membrane or other non-woven material as well as woven material, but not limited to woven material. For purposes of illustration, I have shown plastic tubing heat-sealed at both ends at 13 of the semi-permeable envelope 10, thereby sealing the selected test organism 12 therein.

Preferably, the envelope or bag 10 is a translucent semi-permeable material. As used herein, the word "translucent" is intended to be defined as including "transparent." Moreover, translucency is not essential to the concept of my invention. A dye indicator (pH or O-R) could be used which would change color, bleach out, or induce color or stain an opaque or translucent bag or envelope 10 responsive to the presence of metabolizing bacteria, i.e., the metabolites formed by the living or viable bacteria. A preferable dye indicator is phenol-red because of its pH range and other properties such as its dynamic color change from red to yellow. The phenol-red stains this particular type of bag in the acid range, thereby providing a more positive visual test.

Figure 2:
FIG. 2 is a sectional view taken along the line 2—2 looking in the direction indicated by the arrows.

Dry or otherwise inactive or unincubated growth media 18 such as trypticase-phytone is preferably sealed in the envelope 10 with the selected dry test organisms and carrier 12 and a dry or otherwise inactive or unincubated acid base (pH) or oxidation-reduction (O-R) potential dye indicator 20 may also be incorporated within the sealed envelope as shown in FIGS. 1 and 2. Leucine assay (Difco broth) has also provide a successful growth media.

It will be understood that my invention contemplates the arrangement whereby the growth media 18 is on the outside of the envelope 10 and will penetrate the dialyzable envelope to initiate growth of any living bacteria inside the envelope 10 when the envelope 10 is submerged in a solution including the growth media 18. However, experiments have proved that when the growth media is outside of the semi-permeable envelope initially, it is difficult to control growth due to external contamination which confuses the results and this is particularly true if a dye indicator is incorporated outside of the semi-permeable envelope with the growth media.

As stated in the preamble, one of the disadvantages of the commercial preparation including spores and dry media on blotter paper strips is the ineffectiveness to test gaseous sterilization. I have found that impregnating liquid media on bibulous paper in high concentration proved very successful since this could be sterilized and dried simultaneously by ethylene oxide presterilization prior to incorporation in the heat-sealed pouch. Thus, this media-impregnated paper 18A (FIG. 3) could be used in lieu of the dry nutrients or growth media 18, thereby providing excellent growth.

It will be understood that indicators other than pH and O-R indicators can be used. For example, a fat soluble Lipase indicator such as victoria blue and night blue. Lipase-releasing microorganisms such as some Bacillus species are capable of metabolizing lipids resulting in the release of the dye into the water solution turning a vivid blue.

Another phenomenon which could be utilized as a visual indicator is the ability of some bacteria to liquify gelatin. A mixture of gelatin and carbon-black can be denatured with formaldehyde to form a stable complex until gelatinase by bacterial metabolism breaks down the gelatin, releasing the carbon-black into the solution giving a very vivid indication *Bacillus subtilis* var. *globigii* produce enzymes which convert tryosine to melanine (brown-black) pigments.

Also certain organisms are capable of breaking down glucosides. A dye complex such as indican (a colorless glucoside) can be split at the glucose-dye bond by the metabolism of the living bacteria releasing the indigo blue dye to the media.

Therefore, it is obvious that the dye indicator need only be some form of indicator which is responsive to the presence of metabolizing bacteria.

In carrying out the process, the envelope 10 and contents are preferably placed in the most remote area of the sterilizing chamber and subjected to the sterilizing conditions for the selected sterilizing period. After completion of the sterilizing cycle, the operator may use his hands or unsterile instruments to remove the envelope 10 from the sterilizer and submerge the envelope and contents into ordinary tap water free of chlorine and preferably distilled water. Since bacteria present in either water or air will not permeate the semi-permeable envelope, there is no problem of aseptic transfer. In view of the fact that distilled water is usually slightly acidic, preferably a pH dye indicator solution is mixed with a suitable quantity of NaOH to render the distilled water solution slightly alkaline, preferably in a pH range of 9.5 to 11.00 in order to produce the desired initial color from a pH indicator such as phenol-red and assure stability of color during the incubation period, thereby to assure accuracy of the desired visual color indication at the completion of incubation.

An impermeable outer envelope 14 (FIG. 3) of clear plastic can be provided for this purpose which would serve to keep the envelope 10 submerged and obviates the use of glassware for field use. Outer envelope 14 is heat-sealed at the bottom at 15 and open at the top 16 through which water is introduced and provided with a grommet 17 for hanging. The top of the outer bag 14 preferably is closed at the top after the water is introduced, as for example by mastic tape, or it may be heat-sealed if desired, thereby to prevent evaporation during incubation of the test organism. The envelope 10 being semi-permeable permits the water to readily permeate the envelope 10 and dissolve the growth media and activate any reaction which will occur if the otherwise inactive or unincubated test organisms were not completely killed during the sterilization period.

If the sterilization was ineffective to kill the selected test organisms, then the dye indicator changes color responsive to the growth of the living bacteria of the test organisms in the presence of the growth media. In the absence of a dye indicator, the turbidity change in the growth media may be observed through a translucent envelope. During the incubation period, the water and growth media are maintained at a proper temperature for optimal growth of the test organism.

I have discovered that plastic films comprising poly amide resin commonly solid under the trademarks "Capran-77C," "Portex" and "Nylon-6" are very desirable materials out of which to manufacture the envelope 10. These materials have the desirable characteristics of being: semi-permeable plastic, readily permeable to the common sterilizing agents such as steam, dry heat, radition and the gaseous sterilizing agents such as ethylene oxide, propylene oxide, methyl bromide; readily permeable to water; but impermeable to all bacteria and most microorganisms hereinafter in the claims cumulatively referred to as "bacteria"; whether present in a gas or liquid. This film is heat and adhesive-sealable,, and is readily sterilizable by steam without unfavorable effects on the film.

Figure 3:
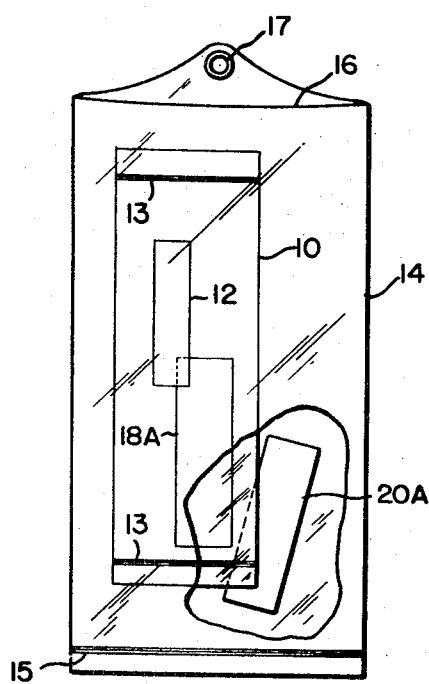
FIG. 3 is a planar view of a second embodiment of my invention.

Preferably, the growth media in the dry form is included in the sealed envelope 10 as illustrated at 18 in FIGS. 1 and 2 or dried on blotter paper as shown at 18A in FIG. 3; in FIG. 3 the dye is dried on the blotter paper 20A and contained in the outer impermeable envelope 14 with the selected test organism 12 and growth media 18A inside of the semi-permeable envelope 10. Depending on the composition of the envelope 10, ions and/or small molecules of metabolites of the living bacteria would diffuse out of the envelope 10 into a water-dye solution externally of the envelope 10 causing a color change in the water-dye solution or staining the envelope 10 externally, thereby indicating lack of sterility. Since some dyes are bacteriocidal or bacteriostatic, it is preferable to have reaction of the dye taking place externally of the inner envelope 10 and separated from the metabolizing bacteria. Another variation of this invention is to provide the dye indicator in an envelope or compartment adjacent the envelope 10 rather than in an outer envelope which completely envelopes the inner envelope 10; however, it is important that the common wall between the organism and media compartment and the dye indicator compartment be semi-permeable so that water and ions and/or small molecules of metabolites of living bacteria will diffuse through the common wall to the dye indicator thereby to give the desired visual indication of sterility or lack thereof.

I have successfully used many dyes and combination of dyes and mordants for fixing the dyes on the envelopes.

Thus, I have provided a new and improved biological sterility indicator and a vastly simplified method of making an accurate biological test of sterility by the use of my indicator.

These sterility indicators can be adapted to most sterilizing techniques now being used on a large scale, including steam, dry heat, boiling water or other liquids, radiation, gaseous agents including but not limited to ethylene oxide, propylene oxide, methyl bromide, and the like. Neither expensive equipment nor sterile transfer areas are necessary with the use of my invention.

By the way of illustration, the following are examples of successful sterility tests utilizing my invention:

EXAMPLE 1

Conditions: The test spores were Bacillus stearothermophilius. Incubation temperature was 54° C. All spore strips were incubated in sterile trypticase soy broth (BBL). The invention included Castle spore strips and separate bibulous paper strips impregnated with tryptone-phytone. These paper strips were heat-sealed in the nylon bag 10 (FIG. 2). To the outer bag 14 of FIG. 1, water las added to the fill mark and several drops of Phenol-red indicator solution were added. Color change was noted in the external solution in 24 hours.

| Results | |
| --- | --- |
| Average No. spores/unit | 200,000. |
| Growth observed | 24 hours. |
| Control 0-min | /1/. |
| No. unsterile/No. tested: | |
| 8/8 | Exposure to 250° F., steam for 10 min. |
| 0/8 | Exposure to 250° F. steam for 15 min. |

EXAMPLE 2

Conditions: The test spores were as follows: Bg—Bacillus globigii; Bc—Bacillus coagulans; Bc and Bg spore strips were incubated in sterile trypticase soy broth (BBL); all incubation temperatures were 35° C.; Ethylene oxide gaseous exposure to 1200 mg. per liter of the gas at 130° F.; chamber prehumidified for 5 minutes to 40% RH. Pre and post-sterilization evacuations to 40 mm. Hg absolute pressure.

| Results | Bg | Bc |
| --- | --- | --- |
| Average No. spores/unit | 1,000,000 | 100,000 |
| Growth observed, hours | 24 | 24 |
| Control 0-min | 1/1 | 1/1 |
| No unsterile/No. tested: | | |
| Exposure ETO 6 min | 3/5 | 5/5 |
| Exposure ETO 8 min | 0/5 | 5/5 |
| Exposure ETO 10 min | 0/5 | 0/5 |

As a further improvement of my prior invention, I have discovered certain advantages of encapsulating the selected dye indicator and/or the selected growth media and/or the selected test organisms in a readily water soluble film-forming substance permeable to selected sterilizing media, preferably a cellulose substratum such as methyl cellulose or hydroxyethyl cellulose. I have also found polyvinyl pyrollidone to be a suitable film-forming substance for this purpose. All of these film-forming substances desirably produce a flexible, thin, encapsulating material. The dye indicators, media and/or test organism is mixed with the readily water soluble, permeable, film-forming substance along with other ingredients hereinafter described.

(I) DYE INDICATOR

The following is the formulation for a 100 milliliter (ml.) volume of stock solution of one embodiment of my improved dye indicator mixture:

For 100 ml. volume of stock solution of formulation— used 1 drop (0.1 ml. volume) dried for each 2–5 ml. $H_2O$ in "outer bag solution."

| | | |
| --- | --- | --- |
| Hydroxyethyl cellulose | g | 7–8 |
| Sodium citrate (buffer) | g | 5 |
| Glycerine (humectant) | g | 2 |
| NaOH—50% concentration | ml | 1.0 |
| Phenol-red (phenolsulfonthalein) | g | 0.05 |
| Distilled $H_2O$ | ml | 100.0 |

While in the liquid state, the dye indicator mixture of film-forming substance is preferably sterilized, thereby to preclude mold forming on the dried film which might otherwise occur.

The film-forming substance mixed with whichever of the selected dye, media or test organism incorporated therein may be dry processed in one of the following two ways:

(1) Spread out in a liquid state on a flat surface to form a thin film which after drying is scraped or otherwise removed from the flat surface on which it is formed and cut into selected sizes suitable for incorporation in the sterility indicator (the preferable manner of dry processing the dye); or (2) As described hereinafter more in detail, selected amounts may be dropped onto a continuous length of semi-permeable sheeting or webbing used to form the sterility indicator envelope (the preferable manner of dry processing both the media and test organism).

Figure 7:
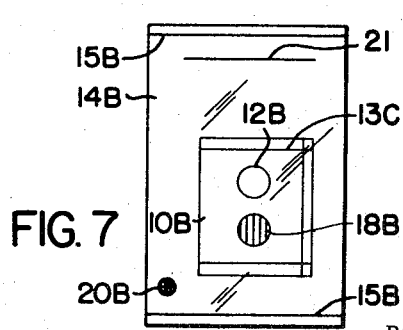

Only 0.10 ml. drop of this formulation when dried into a film as illustrated in FIG. 7 at 20B is used in an outer envelope 14B, into which is added approximately 2–5 ml. of distilled water before incubation. The cellulose substratum is the encapsulating film forming substance with which I preferably mix a buffer such as sodium citrate. I further discovered that it is highly desirable to incorporate a humectant such as glycerine which renders the dried film hydrophilic for the hereinafter described advantages and serves as a good binder and maintains the dried film in a flexible state. The sodium hydroxide as mentioned above renders the distilled water solution when dissolved therein slightly alkaline, preferably in the range of 9.5–11.0, thereby assuring the desired color effect.

The sterilized solution is dropped in one-tenth ml. drops onto a surface where the film is dried and thereafter deposited in the outer bag 14B and serves as a dye indicator in the same manner as the dye indicators 20 and 20A hereinbefore described. The film when dried is a purple dot and when dissolved in water according to my heretofore described process of testing sterilization, the distilled water is colored to a reddish-purple which is maintained if there is sterility, but changes to a yellow color if there is acidity resulting from bacterial growth of the media, indicating lack of sterility. It will be understood that this is merely an improved replacement dye indicator for the heretofore described dye indicator blotter paper 20A or any other suitable dye indicator, solid or otherwise, suitable for holding the dye and preferably a base.

It will be understood that in the absence of a binder, that this formulation when dried would tend generally to form powder which could also be incorporated in the outer bag 20B. The advantages of mixing the dye indicator with a solution of water soluble, permeable, film-forming substance such as just described are as follows:

(1) It provides a convenient carrier which readily dissolves in water thereby very quickly putting the dye in solution as compared to when dye is dried in crystalline form. The dye in the crystalline form tends to form occlusions which are not as readily dissolvable in the water.

(2) It is easier to sterilize. The dye indicator when in dry powders, rather than in my gelatinous flexible encapsulating film, has bacteria formed in occlusions which are not sterilizable.

(3) It has a further advantage over the blotter paper in that when my improved dissolvable dye indicator dissolves in the water to give it the desired coloration, there is no opaque residue such as the blotter 20A remaining in the outer envelope.

(4) I am able to secure more uniform and better quality control by an easier method.

(II) GROWTH MEDIA AND TEST ORGANISM

The following is the formulation of one embodiment of my improved growth media mixture:

| | G. |
|---|---|
| Hydroxyethyl cellulose | 4.0 |
| Beef extract | 0.6 |
| Phytone | 2.0 |
| Sucrose | 5.0 |
| Glycerine | 1.0 |
| Distilled $H_2O$—100.0 ml. | |

When in the liquid state, this mixture is sterilized in order to prevent contamination being introduced into the inner envelope in which both the test organism and growth media are preferably sealed. It will be understood that the growth media may be sterilized after the mixture of film-forming substance is dried since the dried film is permeable to selected sterilizing agents.

Whereas the dye indicator is preferably dried into film droplets 20B and thereafter inserted in the outer bag 14B through a slit 21 provided at the top of the outer bag 14B for receiving the dye indicator 20B, inner envelope 10B and distilled water, I have discovered that my preferred embodiment comprises forming 0.10 ml. volume drops of the growth media formula directly on the dialyzing semi-permeable nylon web, membrane or film 10B where it is dried into a film adhering to the web 10B. The web 10B is of the same composition as the envelope 10 shown in FIG. 1.

The following is the formulation of one embodiment of my improved test organism film-forming mixture incorporating any selected test organism suitable for testing the chosen sterilizing media. In the preferred embodiment, I have chosen the *Bacillus stearothermophilus* (Bstm.) as the test organism for reasons described more in detail hereinafter:

4 g.: Hydroxyethyl cellulose
1 g.: Sucrose
Bstm. @ $5 \times 10^7$
100 ml.: Distilled water Like the growth media, the 0.10 ml. volume drop of test organism film-forming mixture is dropped in droplets 12B on the dialyzing, semi-permeable web or membrane 10B as illustrated in FIG. 4 where it is dried to a film adhering to the semipermeable web 10B.

(III) PROCESS FOR MAKING MY IMPROVED STERILITY INDICATOR

Figure 4:
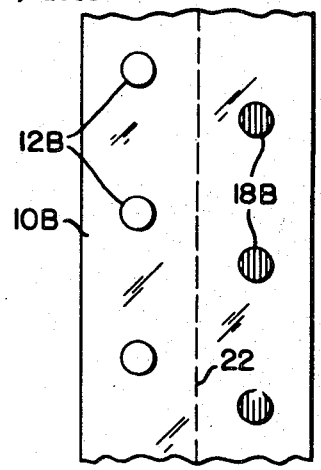
FIGS. 4-7 are planar views of various sequential stages of production of a second and improved embodiment of my invention.

As illustrated in FIG. 4, the liquid droplets of growth media mixture 18B are dropped onto a continuous sheet of dialyzing, semi-permeable nylon or other suitable webbing 10B on the right-hand half thereof. The liquid droplets of test organism mixture 12B are deposited on the left-hand half of the continuous sheet of webbing 10B and spaced vertically between droplets 18B so that when the web of nylon 10B is folded along its middle line at 22, the droplets of growth media 18B and test organism 12B are not contiguous.

Figure 5:
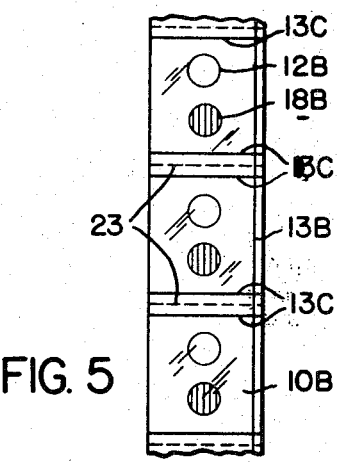
Figure 6:
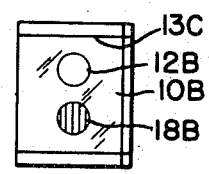

After the droplets 12B and 18B have dried on the webbing 10B to which they adhere, the webbing is folded in the middle as indicated by the broken lines 22 and is continuously heat-sealed along its outer edge or right-hand edge as indicated at 13B in FIG. 5. I also provide a double horizontal heat-seal 13C between each pair of droplets 12B and 18B with a center horizontal perforation 23 between double seals 13C thereby providing a continuous sheet of individual packets or inner envelopes 10B illustrated in FIG. 6, when severed along the perforation line 23. The continuous sheet of severable envelopes 10B illustrated in FIG. 5 may be rolled in rolls or reels of selected length and packaged. This process may be done manually or this process is readily adapted for automation. Each individual envelope 10B as illustrated in FIG. 6 is severed from the continuous sheet shown in FIG. 5 and placed in the sterilizer and after sterilization being tested thereby each envelope 10B is inserted through the slit 21 in the impermeable outer envelope 14B illustrated in FIG. 7 which has the dried encapsulated dye indicator droplet 20B therein. The incubation process including the addition of preferably distilled water to the outer envelope 14B has already been described in the earlier part of this specification.

The advantages of encapsulating the growth media are the same as those above specified for the dye indicator and in addition, has the following further advantages when incorporated in the inner envelope 10B:

(5) Due to its hydrophilic property, it enhances the osmotic characteristics of the inner envelope 10B thereby drawing water more quickly into the inner bag 10B thereby to dissolve the droplets 12B and 18B more rapidly. The osmotic characteristics are particularly enhanced when the hydrophilic encapsulated growth media is dried on and adheres to the inner surface of the inner envelope 10B.

(6) A further advantage when dried on the envelope 10B is that this provides a means of retaining the growth media in a position not contiguous with the test organism 12B until the incubation period. This is particularly important when moisture is present in the media and spore by reason of the humectant, thereby to prevent any germination occurring prior to the incubation period.

The second advantage of the dye indicator above specified is of even more importance as applied to the growth media, since the growth media is incorporated inside of the inner envelope 10B in which the test organism is incorporated. In the case of the dye indicator it is not essential that it be sterilized.

If the dye indicator 20B is incorporated in the inner envelope 10B, which it will be understood could be accomplished, then it also should be dried in selected positions along the continuous web 10B of FIG. 4 spaced in non-contiguous relationship with the droplets 12B and 18B when folded and sealed as illustrated in FIG. 5; however, it is preferable to position the dye indicator 20B outside of the inner envelope as shown in FIG. 7 because the dye indicators tend to inhibit metabolism of the bacteria when located within the inner envelope and this would diminish the accuracy of the test.

In addition to the above defined six advantages of encapsulating the dye indicator and growth media, the encapsulation of the test organism also has the following further advantages:

(7) It provides a permeable barrier which is permeable to ethylene oxide, steam and any of the other sterilants to which the outer permeable envelope 10B is also permeable, whereas prior known encapsulation in crystals such as described in columns 2 and 3 of this specification, provides an impermeable barrier not suitable for fulfilling the desired testing of sterility.

(8) My film-forming encapsulation serves as a barrier which absorbs the ethylene oxide and thus somewhat increases the resistance of spores that are otherwise not resistant to ethylene oxide. This has the advantage of being able to coat a test organism, as for example Bstm., normally non-resistant to ethylene oxide, with the encapsulating film-forming substance rendering such test organisms suitable for testing ethylene oxide sterilization. Thus, I am able to provide a universal type test organism which is suitably resistant to commercially used sterilizing processes comprising steam, dry heat, radiation and ethylene oxide by encapsulating in an ethylene oxide semi-resistant coating.

It will be understood that various types of film-forming substances rendering various types of test organisms resistant to certain types of sterilizing media to which it is otherwise non-resistant, is a matter of choice.

Regarding the specific example of Bstm., this served as the sterility indicator for steam and has to be incubated at the abnormally high temperature of 54° C. which now is an advantage because at 54° C. other types of known test organism will not grow, thus minimizing any inaccuracy of the test because of the presence of other bacteria. Hence, the packing problem need be less fastidious.

The last described advantage (8) of encapsulating the test organism resolves a problem I and others skilled in the art have long attempted to solve, that is, to provide a single test organism suitable as a sterility indicator for presently used commercial sterilizing processes.

In attempting to solve this problem, I have discovered another solution to the problem which although simple, has never, to my knowledge, been known or recognized as the solution to the problem prior to my conception. I provide a composite multiple selected test organism, at least one of which is of suitable resistance to each of the commercially used sterilization processes, i.e., steam, dry heat, radiation, and ethylene oxide. As for example, I have discovered a composite biological sterility indicator suitable for universal use with presently acceptable commercial sterilizing processes by combining Bstm. which is resistant to moist heat, and *Bacillus subtillis* (Bs.) which is of suitable resistance to dry heat, radiation, and ethylene oxide. These I incorporate in the following proportions with 0.10 ml. of distilled water which may be dried on a strip of blotter paper, used in the liquid form, or encapsulated:

Bs: $9 \times 10^5$
Bstm: $1 \times 10^5$
Distilled water—0.10 ml.

Such composite organism indicators are particularly desirable in evaluating sterility of steam because very often there are fluctuations between dry and moist heat and a "gray area" in between during which moist heat (steam), to which Bstm. is resistant, becomes superheated and then subsequently becomes dry heat to which Bstm. is not resistant and Bs. takes over since it is resistant to the latter; hence, with the normal fluctuations between moist and dry heat, I provide a sterility indicator which is adequate to provide an accurate sterility test even in the intermediate "gray area" of superheated steam. This same comparison can be made when ethylene oxide is the sterilizing agent and periods occur during which there is an inadequate supply of ethylene oxide but there is sufficiently high temperatures and moisture present to otherwise effectively continue the sterilization process.

While I have shown and described the preferred embodiment of my invention, it will be apparent that various modifications and changes may be made therein particularly in the form and relation of parts, without departing from the spirit of my invention as set forth in the appended claims.

I claim:
1. A sterility indicator comprising:
    (a) an envelope, being permeable to a selected gaseous sterilizing media but being impermeable to a selected suitable test organism and to bacteria;
    (b) a selected quantity of test organisms being resistant to the selected gaseous sterilizing media, being in an unincubated state, and being sealed within said envelope; and
    (c) a selected quantity of a selected growth media in an unincubated state sealed within said envelope.
2. The article according to claim 1 including means for incubating, in said envelope, said quantity of said test organism.
3. The article according to claim 2 wherein said incubating means includes means for adding water to said selected quantity of test organisms while said quantity of test organisms are still sealed within said envelope.
4. The article according to claim 1 wherein the sterilizing media comprises ethylene oxide.
5. The article according to claim 4 wherein the selected test organism comprises *Bacillus subtillis*.
6. The article according to claim 1 wherein the sterilizing media comprises moist heat.
7. The article according to claim 6 wherein the selected test organism comprises *Bacillus stearothermophilus*.
8. The method for testing sterility comprising:
    (a) subjecting to a selected gas sterilizing media for a selected sterilizing period, a selected quantity of a suitable test organism resistant to the selected gas sterilizing media, said quantity of test organism being in an unincubated state and being sealed within an envelope permeable to said selected gas sterilizing media but impermeable to said selected suitable test organisms and to bacteria; and then
    (b) incubating, in said envelope, said test organisms.

9. The method according to claim 8 wherein said incubating step includes incubating said test organisms for a selected test period and under selected conditions suitable for growth of said test organisms.

10. The method according to claim 9 wherein said incubating step includes exposing said test organisms to water and to growth media in said envelope.

11. The article according to claim 1 wherein said envelope is semi-permeable.

12. The method according to claim 8 wherein, in said subjecting step, said envelope is semi-permeable.

References Cited
UNITED STATES PATENTS

| | | | |
|---|---|---|---|
| 3,062,737 | 11/1962 | Azorlosa et al. | 210—22 |
| 2,704,260 | 3/1955 | Heisler et al. | 210—22 |
| 3,395,025 | 7/1968 | Hermanson | 99—171(H) |
| 3,346,464 | 10/1967 | Ernst | 195—103.5 R |
| 3,072,528 | 1/1963 | Kludas et al. | 195—54 |
| 3,257,161 | 6/1966 | Kaye | 195—103.5 R |
| 3,102,082 | 8/1963 | Brewer | 195—139 |
| 2,904,474 | 9/1959 | Forg | 195—139 |
| 2,854,384 | 9/1958 | Beakley et al. | 195—103.5 R |

ALVIN E. TANENHOLTZ, Primary Examiner

U.S. Cl. X.R.

195—59